US006331864B1

(12) United States Patent
Coco et al.

(10) Patent No.: US 6,331,864 B1
(45) Date of Patent: *Dec. 18, 2001

(54) REAL-TIME MULTIMEDIA VISUAL PROGRAMMING SYSTEM

(75) Inventors: Geoffrey P. Coco; C. Phillip Reay, both of Seattle, WA (US)

(73) Assignee: Onadime, Inc., Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,618

(22) Filed: Sep. 23, 1997

(51) Int. Cl.⁷ .............................. G06F 9/44; G06F 13/00
(52) U.S. Cl. ........................................... 345/763; 345/771
(58) Field of Search .................................. 345/339, 348, 345/349, 326, 333, 334, 335, 967; 364/188, 191, 578; 395/500, 701, 710, 500.34, 500.43; 700/83, 86; 702/123; 703/13, 22; 717/1, 10

(56) References Cited

U.S. PATENT DOCUMENTS

| | | | |
|---|---|---|---|
| 4,885,717 | * 12/1989 | Beck et al. ............................ | 395/704 |
| 4,914,568 | 4/1990 | Kodosky et al. ...................... | 345/349 |
| 5,285,376 | * 2/1994 | Struger et al. ......................... | 700/18 |
| 5,291,587 | 3/1994 | Kodosky et al. ...................... | 395/500 |
| 5,301,259 | 4/1994 | Gibson et al. ......................... | 704/258 |
| 5,301,301 | 4/1994 | Kodosky et al. ...................... | 395/500 |
| 5,327,529 | 7/1994 | Fults et al. ............................. | 345/335 |
| 5,377,318 | 12/1994 | Wolber ................................... | 345/347 |
| 5,386,568 | 1/1995 | Wold et al. ............................ | 395/710 |
| 5,388,264 | * 2/1995 | Tobias, II et al. ..................... | 707/103 |
| 5,392,207 | * 2/1995 | Wilson et al. ..................... | 345/349 X |
| 5,398,313 | 3/1995 | Kojima et al. ........................ | 395/702 |
| 5,432,903 | 7/1995 | Frid-Nielsen ......................... | 345/349 |
| 5,437,007 | * 7/1995 | Bailey et al. ......................... | 345/349 |
| 5,475,851 | 12/1995 | Kodosky et al. ..................... | 345/339 |
| 5,481,741 | * 1/1996 | McKaskle et al. ............... | 345/349 X |
| 5,537,630 | 7/1996 | Berry et al. ........................... | 345/326 |
| 5,557,730 | 9/1996 | Frid-Nielsen ......................... | 345/349 |
| 5,566,294 | 10/1996 | Kojima et al. ........................ | 345/348 |
| 5,590,271 | 12/1996 | Klinker ................................. | 345/326 |
| 5,619,636 | * 4/1997 | Sweat et al. .......................... | 345/302 |
| 5,623,592 | * 4/1997 | Carlson et al. ....................... | 345/348 |
| 5,642,511 | 6/1997 | Chow et al. .......................... | 395/701 |
| 5,651,108 | * 7/1997 | Cain et al. ............................ | 345/340 |
| 5,706,453 | * 1/1998 | Cheng et al. ......................... | 345/347 |
| 5,850,548 | * 12/1998 | Williams .............................. | 395/701 |

OTHER PUBLICATIONS

Konstantinos Konstantinides and John R. Rasure, "The Khoros Software Development Environment for Image and Signal Processing," 8395 IEEE Transactions on Image Processing, 3(1994)May, No.3, New York, US, pp. 243–252.

* cited by examiner

Primary Examiner—Crescelle N. Dela Torre
(74) Attorney, Agent, or Firm—Christensen O'Connor Johnson Kindness PLLC

(57) ABSTRACT

A user friendly visual programming system with a visual programming interface that allows a user to visually create multimedia programs in real-time. In this system, input and output functions are represented as graphical input and receive interface leads, respectively. A user with no programming skill easily links desired transmit interface leads to desired receive interface leads. In real-time, the output devices perform the functions associated with receive interface leads and any changes to the receive interface leads that occur as a result of any links to transmit interface leads. The user may create complex programs by encapsulating input and receive interface leads in an endless number encapsulation layers.

56 Claims, 8 Drawing Sheets

REAL-TIME MULTIMEDIA VISUAL PROGRAMMING SYSTEM

FIELD OF THE INVENTION

This invention relates generally to programming environments and, more specifically, to an improved visual programming interface and interface support process.

BACKGROUND OF THE INVENTION

In the fields of computational control and research, events are abstractions which are typically based upon physical phenomena. Researchers or real-time managers may gain access to these events through mathematical, numerical, textual, audio or graphical techniques. Although each of these techniques augments the perspectives brought to bear on an event, each has its advantages and disadvantages when conveying information.

Comprehension of information results from the interplay and juxtaposition of these various techniques. That is, the juxtaposition of graphical, textual, and numerical techniques gives graduated access to data streams. Visual representation, i.e., the use of visual and auditory displays to represent information, has emerged as a desirable environment with which to effectively convey information, because visual representation allows simultaneous presentation of multiple data streams.

Some general-purpose visualization systems include visual programming interfaces for researchers/users to create their own visualization environments from a library of program modules. The researcher/user must have a reasonably good understanding of software coding, because a visual program module within a standard visual programming interface is a software-coded process consisting of a sequence of operations that are organized to produce a specified result. The visual programming interfaces contain graphical tools for users to interactively assemble the modules into dataflow configurations of communication processes so that the users may visualize their data and created dataflow configurations. That is, an output port of one module may be connected to the input port of another module so that when data flows between the modules, the latter module's operations are performed. This requires that the user understand object oriented programming structure and data representation techniques to connect and interpret connected modules. A typical dataflow configuration may thus include a series of interconnected modules that are configured to read data, process that data into new representations, and then display the data on a computer screen.

Despite their flexibility towards customizing dataflow configurations, the general-purpose visual programming systems are not well suited for exploring real-time data streams' interactions or computational research data, or creating multimedia experiences, because they lack essential interactive capabilities and require a user to have expert programming knowledge. For example, user interaction is typically limited to selecting the means for displaying the data without any means for interactively manipulating the data at various stages of the dataflow configuration. As a result, data can only be arranged in specific preconfigured visual arrangements.

In other words, known visual programming systems allow users to merely visualize their data in pre-established ways. This is particularly true in applications involving analysis of empirical data and multimedia programs that allow increased user expression. However, in order to fully analyze or experience their data, users must have real-time tools to probe the value of individual data elements as they impact a variety of parameters. Then they must be able to apply special procedures to a small region-of-interest, e.g., compute the mean data value of a subset of data elements. Further, users must be able to visualize relationships between the data elements in several images or volumes which may span several windows of a computer display.

In summary, there do not exist any visual programming tools that allow a person with little or no programming skill to create in real-time elaborate multimedia audio-visual episodes, computational research studies or human-machine interface with which anyone can interact using a multitude of input and output devices.

The present invention is directed to overcoming the foregoing and other disadvantages. More specifically, the present invention is directed to providing a visual programming interface that allows a user with no programming skill to create in real-time programs for exploring management control options, computational research data relationships or multimedia experiences.

SUMMARY OF THE INVENTION

In accordance with the present invention, a visual programming system with a visual programming interface is provided that allows a user to visually create multimedia programs in real-time. In this system, input and output functions are represented as graphical transmit and receive interface leads, respectively. A user with no programming skill easily links desired transmit interface leads to desired receive interface leads. In real-time, the output devices perform the functions associated with receive interface leads and any changes to the receive interface leads that occur as a result of any links to transmit interface leads. The user may create complex programs by encapsulating transmit and receive interface leads in a boundless number of encapsulation layers, limited only by memory and processor speed.

As will be readily appreciated from the foregoing summary, the invention provides a new and improved method, apparatus and computer-readable medium for visually programming a multimedia program in real-time. The created multimedia program can be saved. The saved multimedia program can then be executed. The program can be manipulated in real-time during execution. Given the nature of the input and/or output device, the computer program created using the GUI 66 may also be referred to as an "arrangement" or a "composition" of inputs and outputs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
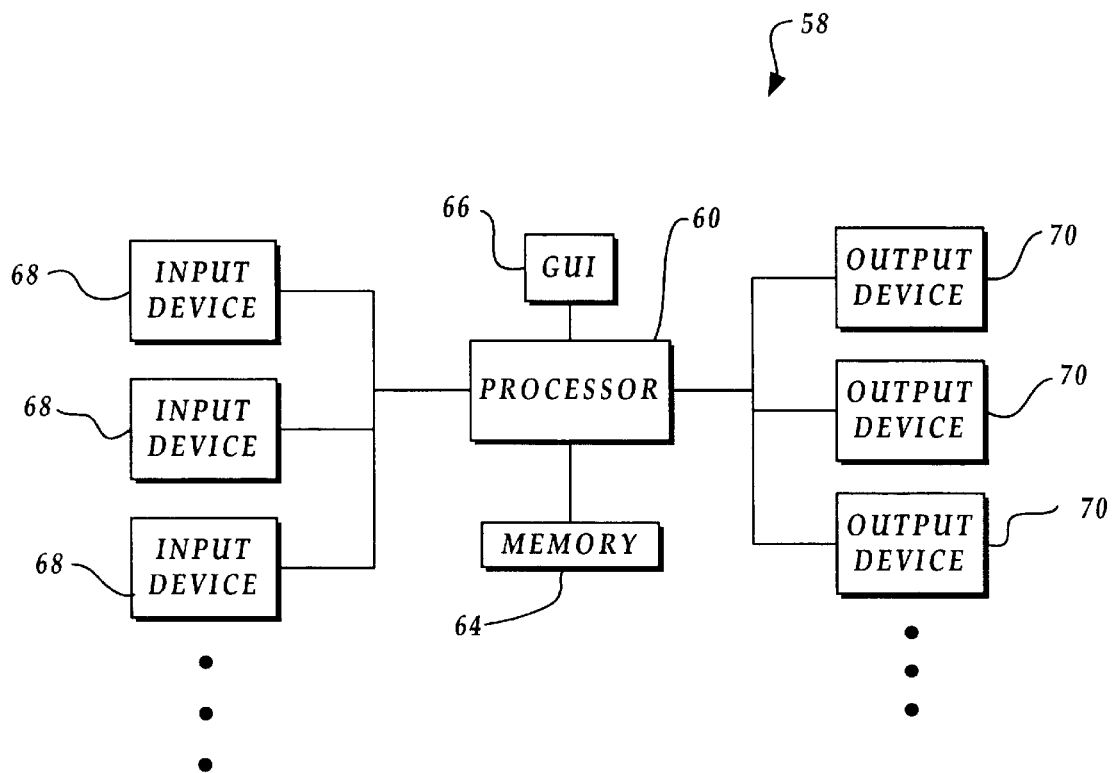
FIG. 1 is a block diagram of a visual programming system formed in accordance with the present invention.

FIG. 1 illustrates a visual programming system 58 that allows a user with no programming skill to create a multimedia (i.e., a combination of sound, graphics, animation and video) computer program without writing linear text-based code which may then be re-executed as desired by the user. The visual programming system 58 includes a processor 60, and a memory 64, a graphical user interface (GUI) 66 and one or more user designated input and output devices 68 and 70 coupled to the processor 60. System 58 allows interconnection between any input and output functions of input and output devices 68 and 70, respectively, regardless of what those devices may be. The input devices are complex, dynamic data producing or generating devices, such as a mouse, digital pen, joystick, MIDI keyboard, cd-rom, distal rideo disc (DVD) touch pad, motion, position, light or heat sensors, or internally generated mathematical signals determined from an internal clock signal or some other base information. The output devices react to produced data. Examples of output devices are printers, displays, writeable CDs, tapes (e.g., DAT tape), disk, MIDI sound processors, robotics animatronics, machinery manufacturing equipment, etc. Input and output devices 68 and 70 may be coupled to processor 60 through a local direct connection or remotely through a local area or public data network. It will be appreciated that the above examples of input and output devices are given for illustrative purposes only, and are not intended to limit the scope of the invention.

An input device function identifies, in code (e.g. a device driver), an operation or function performed by an input device. Input devices are external or internal to the host processor that is performing the present invention. An example of an external input device is a mouse with input functions of left button activate, move mouse vertically, move mouse horizontally, etc. An example of an internal input device is a clock signal with input functions that are mathematical interpretations of the clock signal. In a typical GUI, each of these functions generate or produce data. An output device function identifies, in code (e.g. device driver), an operation or function performed by an output device. If the output device is a display device, examples of output functions are display a square, move the square vertically, move the square horizontally, paint the square a certain color, etc. The display device receives or reacts to data that indicate what to display, where to display it, how to display it, etc. Thus, output device functions react to data.

Figure 3:
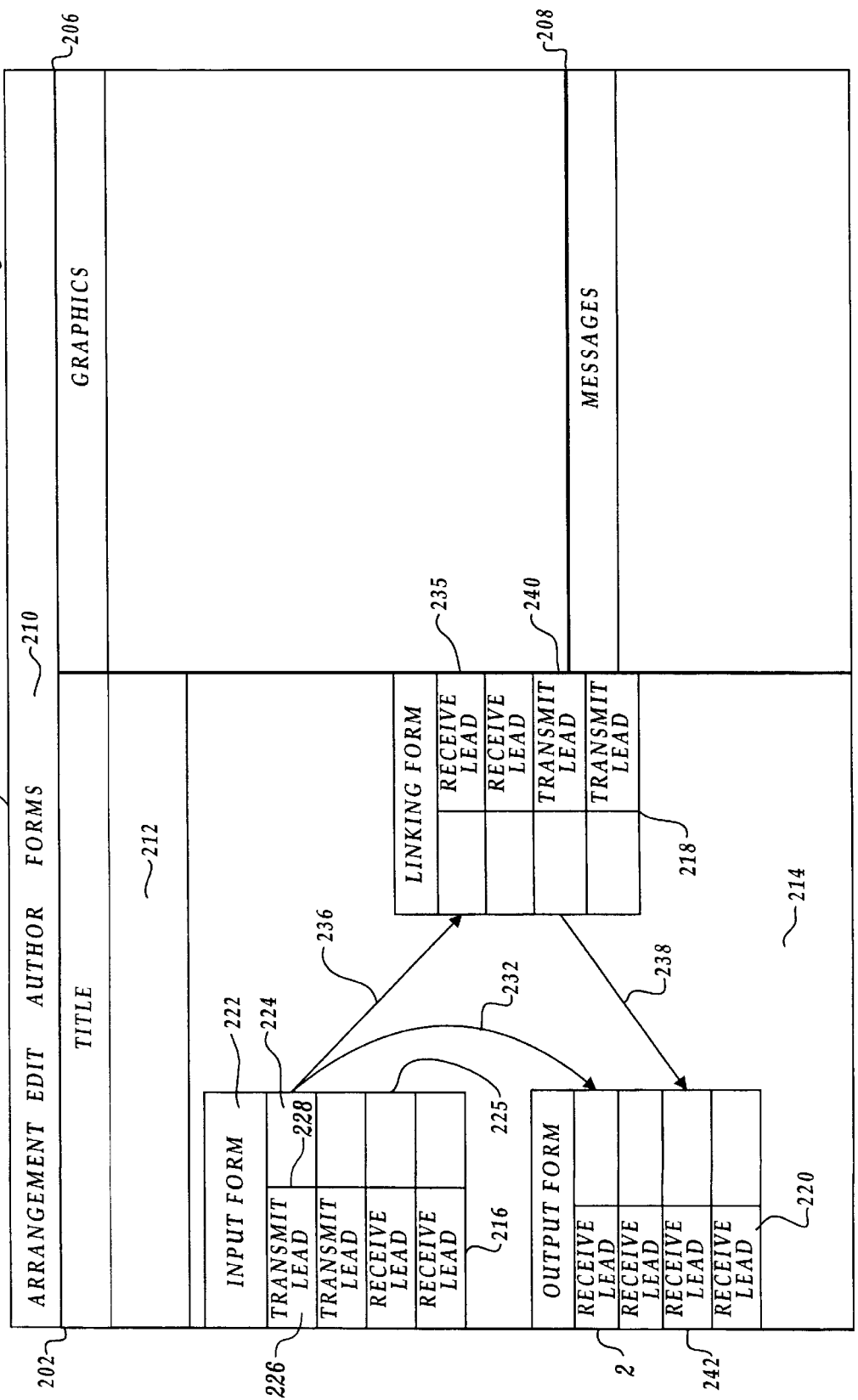
FIG. 3 is an illustration of a graphical user interface used in accordance with the present invention for establishing links between established raw data translations, thereby creating multimedia programs.

GUI 66 of the visual programming system 58 allows a person with any level of programming knowledge to easily create a multimedia program by defining the relationship between any input device function and any output device function. More specifically, the unskilled user can utilize the GUI 66 to assemble and link an input device 68 to an output device 70, in order to easily create and test a program in real-time. The GUI 66 is illustrated in FIG. 3 and described in more detail below.

Figure 2:
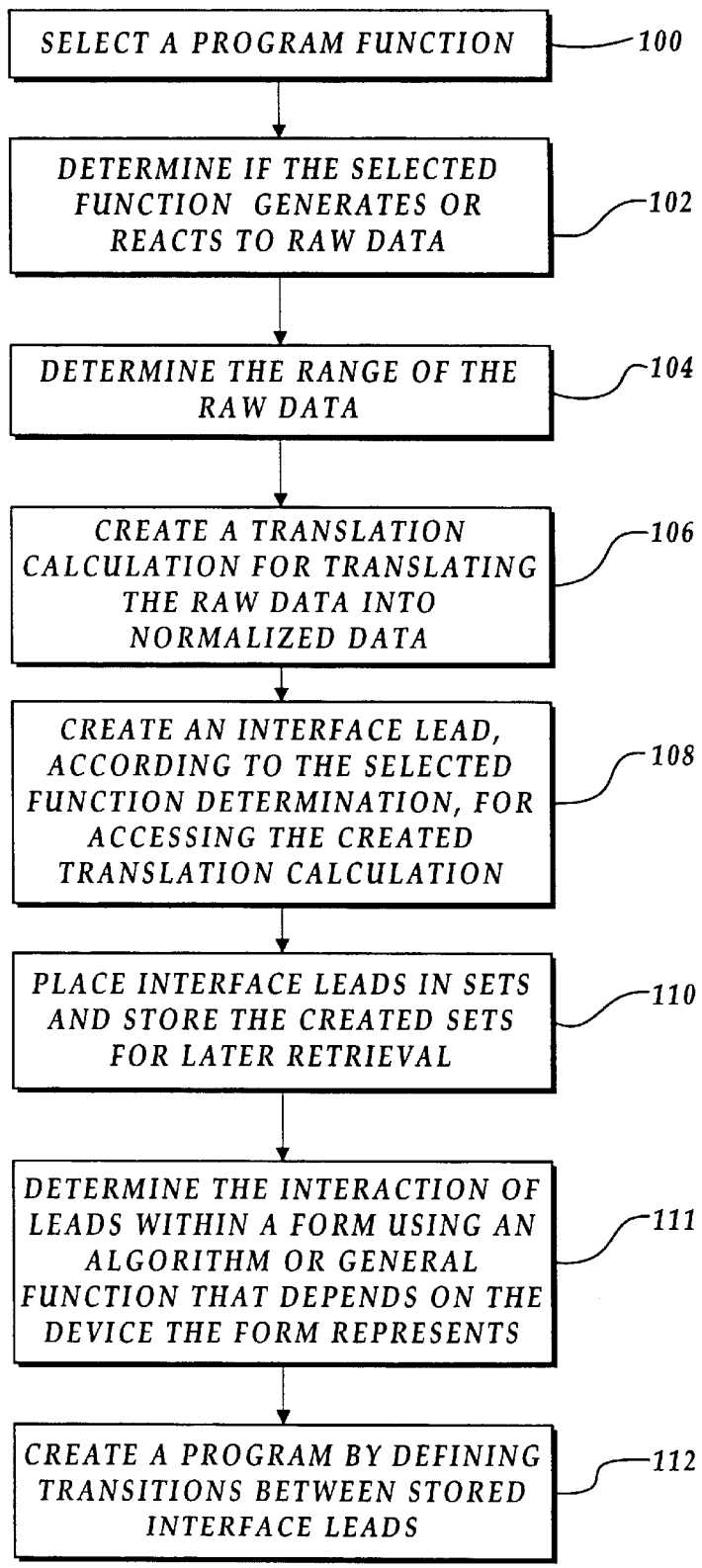
FIG. 2 is a flow diagram illustrating the process for establishing raw data translations and creating a multimedia program based on the translations in accordance with the present invention.

Prior to unskilled user interaction with the GUI 66, however, the raw data translations utilized by input and output functions are determined by a somewhat more skilled programmer. The first seven steps of FIG. 2 illustrate the process which is performed by such a programmer. A somewhat skilled programmer performs these steps because they are performed at a programming level prior to using the GUI 66 to link input devices to output devices, in order to create a program. First, at block 100, a data retrieval, data producing or data manipulating function associated with an input or output device is selected. Functions are typically written into the code of an input or output's device driver. Next in block 102, it is determined if the selected function generates, reacts to or manipulates data, as described above. This data (hereinafter "raw data") is generated by an input function or received by an output function. At block 104, the range of the raw data is determined. The range of the raw data is determined by the raw data's upper and lower limit determined according to predefined requirements of the associated input or output device. At block 106, a translation calculation is created for translating the raw data into normalized data or normalized data into raw data. Normalized data is a bounded scalar number with a predesignated data range. The following equations are the translation calculation for translating raw data into normalized data $$ActNormValue = MinNorm + \left[\frac{(ActRaw - MinRaw) \times NormvalueRange}{RawRange}\right] \quad (1)$$

$$NormvalueRange = MaxNorm - MinNorm \quad (2)$$

where:

ActNormvalue is the actual normalized data value;

ActRaw is the actual raw data value;

NormvalueRange is the range of normalized data;

RawRange is the range of raw data values;

MinNorm and MaxNorm are the minimum and maximum normalized data values within the normalized data range; and MinRaw and MaxRaw are the minimum and maximum raw data values within the raw range.

The following equations provide the translation calculation for translating normalized data into raw data.

$$ActRawvalue = MinRaw + \left[\frac{(ActNormvalue - MinNorm) \times RawRange}{NormvalueRange}\right] \quad (3)$$

$$RawRange = MaxRaw - MinRaw \quad (4)$$

The scale of normalized data is the same regardless of the raw data scale. Data represented as normalized ranges allows for the simplification in a visual interface, illustrated in FIG. 3 and described below. Normalization produces an underlying language that has only one data type, with the key internal distinction being whether the data is transmitted or received with the interface.

Then in block 108, an interface lead is created, according to the selected function determination, for accessing a specific created translation calculation. An interface lead is a graphical interface tool used in the GUI 66. If the selected function was determined to produce data, the interface lead is a transmit interface lead. If the selected function was determined to react to data, the interface lead is a receive interface lead. Interface leads are further illustrated in FIGS. 3 and 6–8 described below. In block 110, interface leads are placed into sets of leads or forms, that are then stored in memory 64 for easy retrieval and execution through the user interface 66. In block 111, the interaction of the leads within a form are defined using a algorithm or general function that depends upon the device the form represents. For example, if the form manipulates data, the data manipulating algorithm is defined. Forms are implemented as graphical interface tools used in GUI 66, and are illustrated in FIGS. 3 and 6–8 described below. It can be appreciated by one of ordinary skill in the art of device drivers and control programming languages, that these steps can be implemented in various programming languages in various order.

Upon completion of storage of created interface leads and forms, a user with little or no programming skills can create a multimedia program by defining links between the created and stored input and receive interface leads using the GUI 66 as shown at block 112. Because transmit interface leads represent functions that generate data and receive interface leads represent functions that react to data, only a transmit interface lead may be linked to a receive interface lead. Multiple receive interface leads may be linked to a single transmit interface lead. The interface leads may be linked, because of the use of normalized data which allows the linking of leads without concern for raw data types or raw data numerical ranges. It will be obvious to one of ordinary skill in the art of data assignment that the process illustrated in FIG. 2 is not restricted to the order shown.

Figure 4:
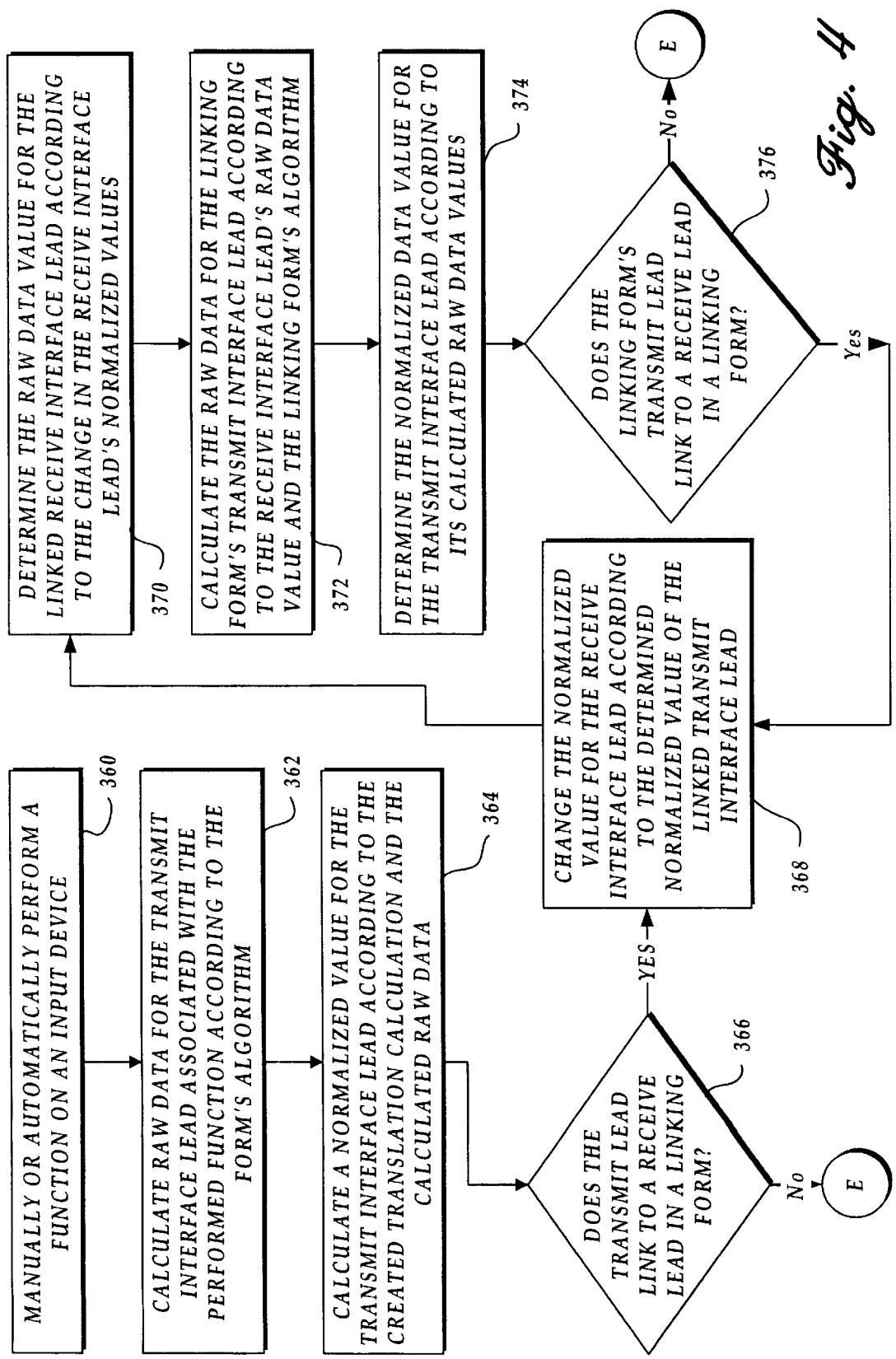
FIGS. 4 and 5 are flow diagrams illustrating the process by which the visual programming system executes the multimedia program created in FIG. 2.
Figure 5:
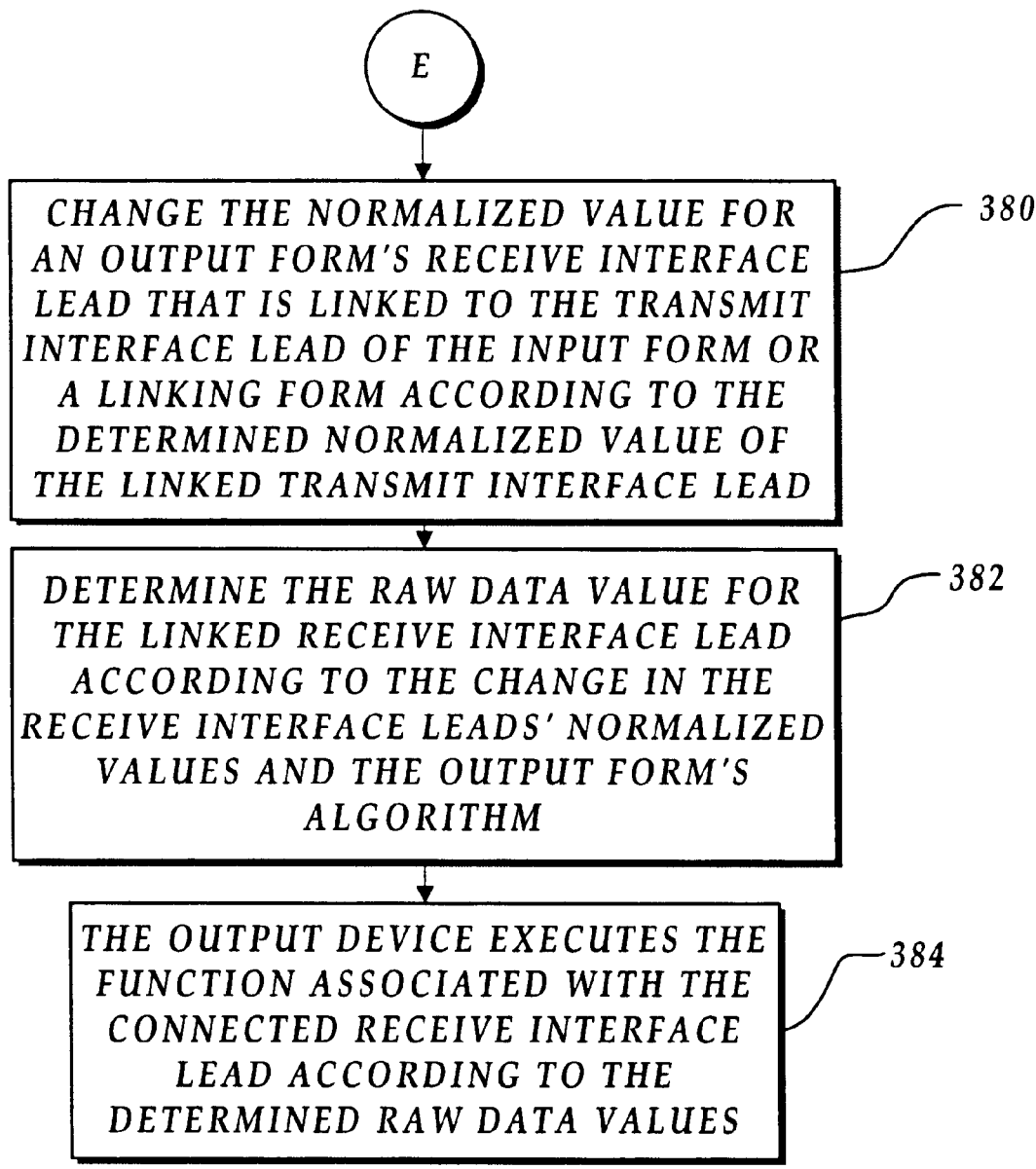

An embodiment of GUI 66 that allows a user with no programming skill to create a multimedia program by defining links between interface leads is described below with respect to FIG. 3. Multimedia program interaction is illustrated in FIGS. 4 and 5 described below.

As shown in FIG. 3, the GUI 66 of the visual programming system 58 is implemented in a window-type operating system. The GUI 66 includes a user interface window 200, whereby user interaction with user interface window 200 is provided by a mouse, a keyboard, a touch screen or any other type of user interface device. The user interface window 200 includes a programming window 202, a display window 206 and a messages window 208. Included as part of the user interface window 200 are pull-down command menus 210, for executing predefined commands, and other features described below. The programming window 202 includes a control area 212 and an operating area 214. Displayed in the operating area 214 are user selected predefined objects, called forms 216, 218 and 220, retrieved from memory using the pull-down command menus 210. The pull-down menus 210 include commands for editing, such as cut, copy and paste, changing styles and manipulating the information displayed in the control area 212 and operating area 214, accessing stored forms, storing programs, executing stored programs, and changing window presentations and preferences.

As described above, the interface leads are transmit 224 or receive 225 interface leads. Interface leads 224 and 225 include a title section 226 and a control section 228. The title in the title section 226 generally describes the function associated with the interface lead 224 and 225 and the control section 228 displays a graphical control of the normalized data value that normalizes the raw data of the function associated with the interface lead 224 and 225. The control section 228 may be of various graphical control formats, such as a slider, meter, menu, number readout, or toggle. Therefore, if the output function represented by a receive interface lead is the volume output of a musical note, the control display featured in the control section 228 of the receive interface lead may be a slider for adjusting the volume of the outputted musical note.

Figure 6:
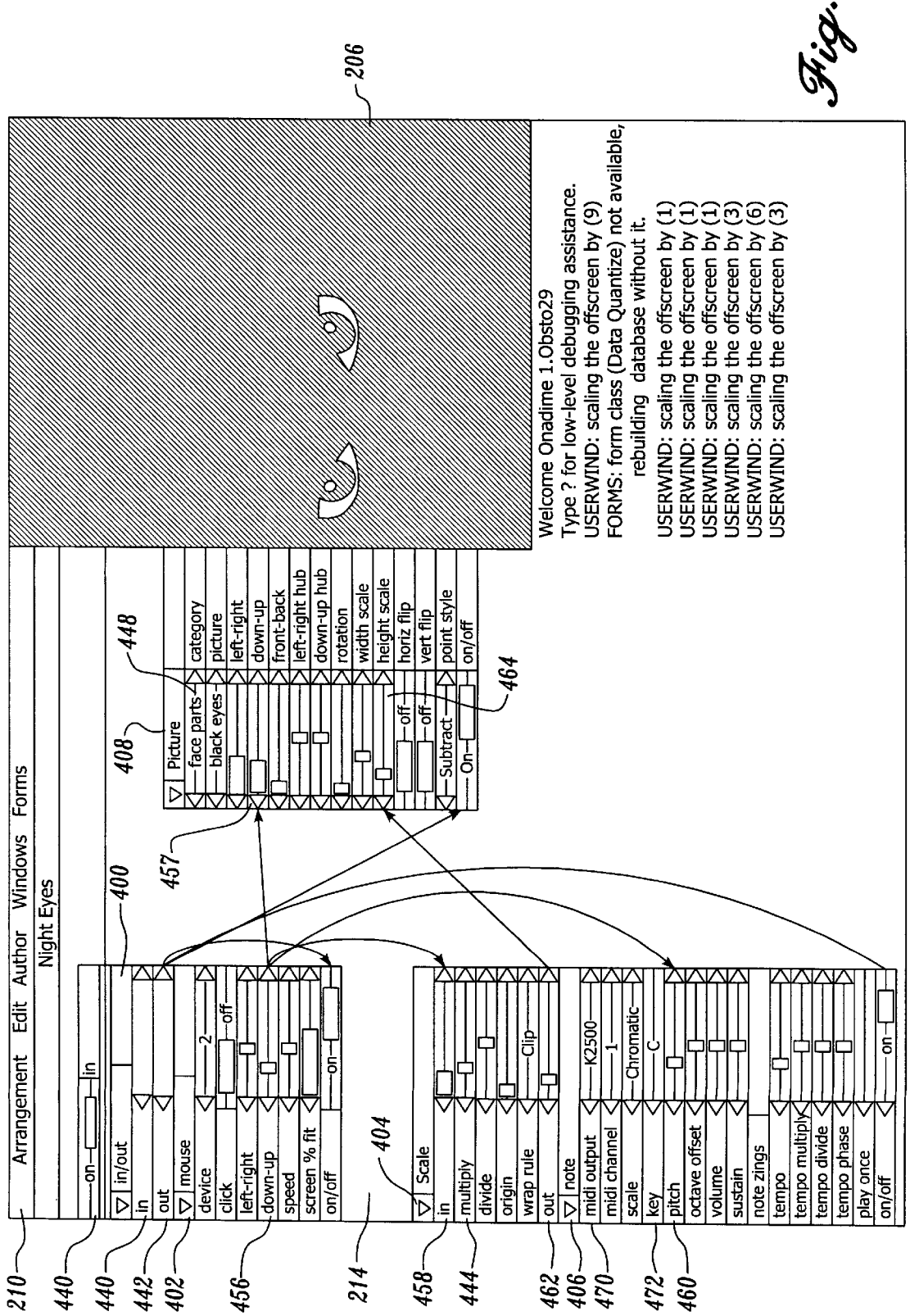
FIGS. 6–8 are illustrations of a program with established links between established raw data translations created in accordance with the present invention.

Forms are rectangular graphical images that include a title section 222 and one or more transmit or receive interface leads displayed below the title section 222. Forms are defined as one of three types: input 216; linking 218; and output 220. Input forms 216 represent manually controlled input devices, such as a mouse, digital pen, joystick, touch pad, etc. or automatically controlled input devices, such as motion, position, light or heat sensors, various types of signals generated from an internal clock signal, etc. Linking forms 218 have no external dependencies or effects. Linking forms 218 serve as a data manipulating link between input and output forms for creating a chain of forms. A linking form 218 may be linked to other linking forms 218 Output forms 220 represent output devices, such as predefined graphical objects (digital video, pictures, simple shapes, etc.), externally connected output devices such as video or audio devices, recorded gestures of an interface device, or computer controlled medical or manufacturing equipment. Predefined within a form is a description or algorithm that defines the relationship of the transmit and receive leads 224 and 225 within it. This defined relationship depends upon what the form represents. Examples of this relationship are illustrated in FIG. 6 and described in more detail below.

As noted above, only a transmit interface lead 224 may be linked to a receive interface lead 225 in a one to many relationship. Within the user interface window 200, transmit and receive interface leads 224 and 225 are identified by different colors or by some other graphically different means. A user links interface leads by dragging and dropping one interface lead onto another, by designating links using the keyboard or by some other user friendly method. When two interface leads are linked an arrow points from the transmit interface lead 224 to the receive interface lead 225, thereby indicating that the manipulation of the function identified by the transmit interface lead 224 will change the function identified by the receive interface lead 225. For example, if the output form 220 represents a graphical image, such as a digital picture, a simple graphics image, digital video, etc., the graphical image that is associated with the output form 220 is presented in the display window 206 in real-time. If a receive interface lead 230 of the output form 220 has a arrow 232 linking it to a transmit interface lead 224 of an input form 216, the linked transmit interface lead 224 translates raw data from an associated input device function to normalized data, thus changing the normalized data of the receive interface lead 230 of the output form 220. The normalized data of the receive interface lead 230 of the output form 220 is translated into raw data, thus changing the displayed graphical image. Also, any manipulation of the control section 228 of any receive interface lead of the output form 220 causes the displayed graphical image to change in real-time, according to the manipulated interface lead and that interface lead's associated function. In other words, if the normalized data is changed, the raw data is changed.

Figure 7:
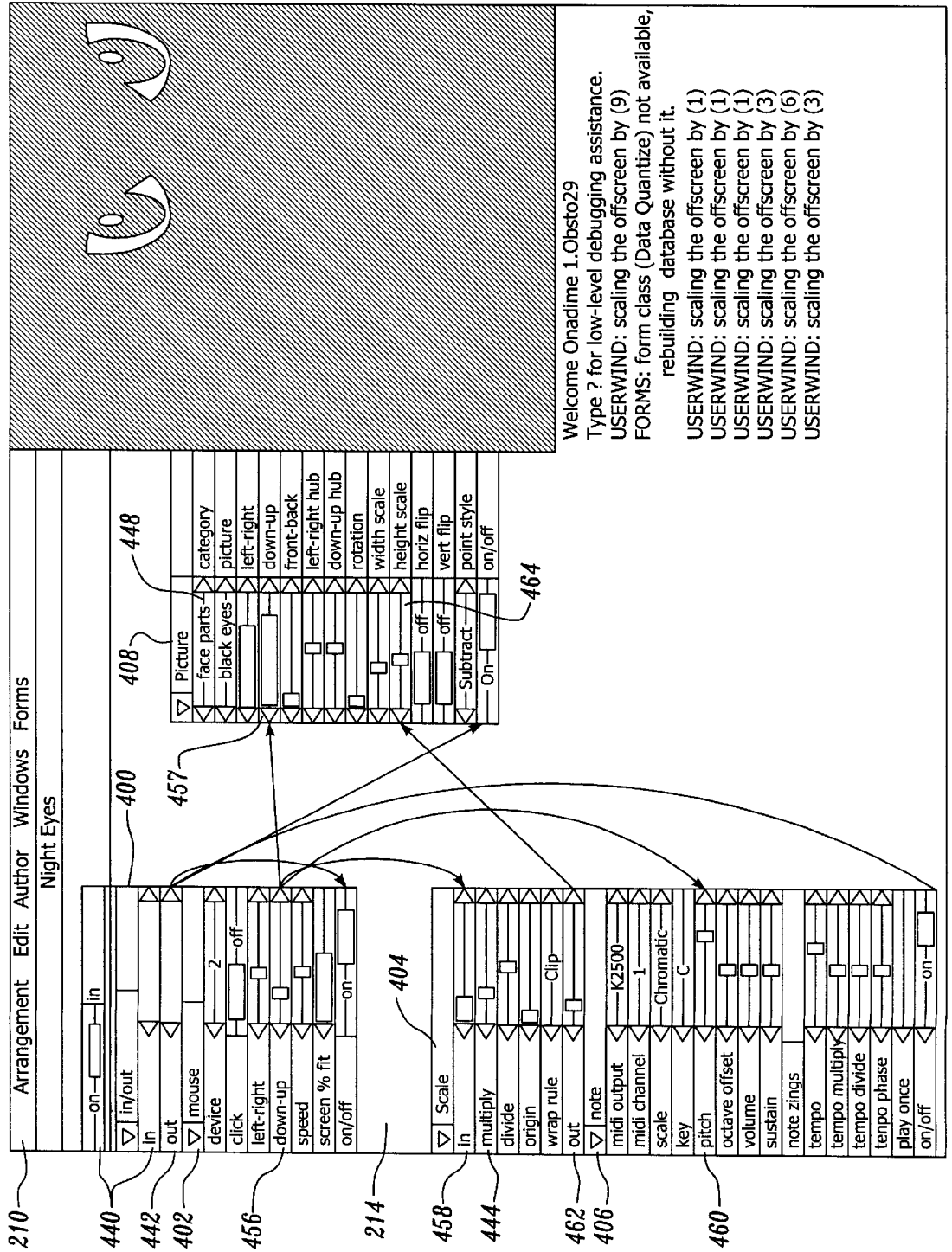

Still referring to FIG. 3, arrow 236 connects receive interface lead 235 of linking form 218 to transmit interface lead 224 of input form 216 and arrow 238 connects transmit interface lead 240 of linking form 218 to receive interface lead 242 of output form 220. As described above for linking forms, transmit interface lead 240's raw data value is determined according to the raw data value of receive interface lead 235 and linking form 218's predefined lead relationship algorithm. Then, the normalized data value for transmit interface lead 240 is determined. Next, the normalized data value of transmit interface lead 240 is transmitted to the receive interface lead 242 linked according to arrow 238, and the raw data for the function associated with receive interface lead 242 is determined and executed. Examples of linking forms are also shown in FIGS. 6 and 7.

Figure 8:
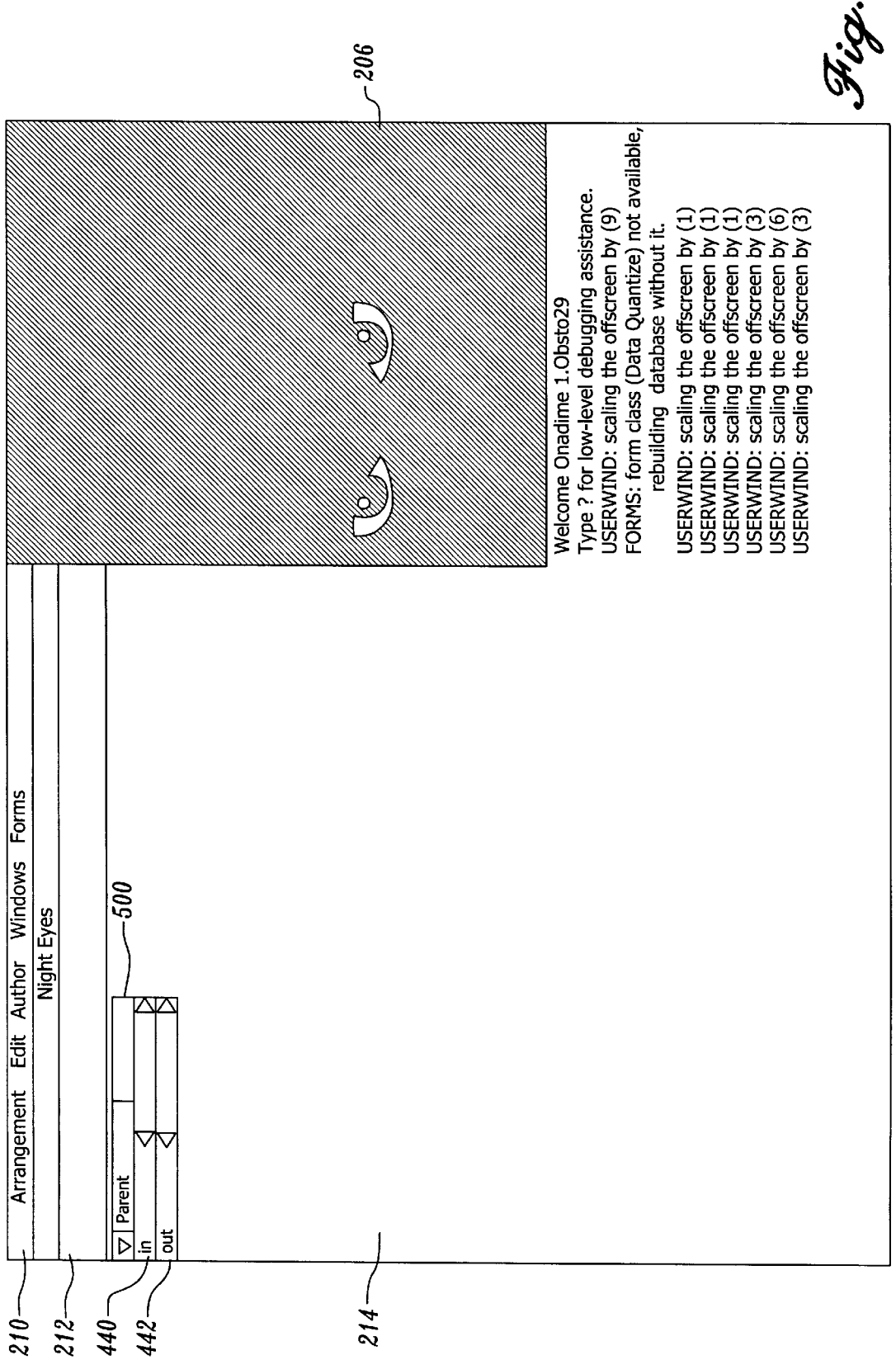

The control area 212 displays interface leads that encapsulate the forms displayed in the operating area 214. Entry of interface leads into the control area 212 is accomplished by activating the display cursor on an interface lead within a form displayed within the operating area 214, dragging the cursor to the control area 212 and deactivating the cursor, thereby producing a copy of the interface lead and leaving it in the operating area 214. The message window 208 provides command help and computer operation and system performance feedback. The display window 206 displays the graphical images associated with graphical-type forms. It can be appreciated to one of ordinary skill in the art of device representation, that virtually any electrically connectable input or output device or any data manipulation process can be represented by a form. Form encapsulation can occur at any level within a nested hierarchy of forms. An interface lead within a form can represent unexposed interface leads in a hierarchical manner (child and parent interface leads). This allows a user to create several child interface leads or forms that refer to the same parent interface lead. When a displayed parent interface lead is manipulated, the normalized data of the child interface leads are kept the same as that of the displayed parent interface lead, because the parent is essentially a ghost of the child. If desired, the user may display child interface leads for providing separate output interface links to a child interface lead. A transmit interface lead in a form may be "locally" available to sibling forms within a parent form, but unavailable to forms external to the parent. A user can specify that a transmit or a receive interface lead is externally available to other forms by placing the lead in the control area 212, thereby "publishing" the interface lead making it visible in the parent's operating area 214. This encapsulation of forms and interface leads simplifies the reuse of information and processing and simplifies visual comprehension of the program. In addition, an encapsulated form behaves as any other form and may be saved independently for later use. An example of form encapsulation is illustrated in FIGS. 8 and described below.

The GUI 66 automatically controls placement of the forms within the operating area 214. This ensures that all arrows representing links between leads of various forms are never obscured by another form. This automatic form placement allows a user to see all the links on a particular level. Also, as the cursor passes over an interface lead all of the links for that lead are highlighted.

FIGS. 4 and 5 illustrate dataflow of a created multimedia program. First, at block 360, a function is manually or automatically performed on an input device. For example, a mouse is moved to the left or a sensor reaches a predefined sensor limit. At block 362, raw data is calculated for an input form's transmit interface lead associated with the performed function, according to the function performed and the form's predefined algorithm. Next at block 364, a normalized data value for the transmit interface lead is calculated according to the created translation calculation and the calculated raw data. Then at decision block 366, any links of the transmit interface lead to other receive interface leads is determined. If the transmit interface lead is linked to a receive interface lead in a linking form, the normalized value for the receive interface lead is changed according to the calculated normalized value of the linked transmit interface lead, see block 368. Further at block 370, the receive interface lead's raw data value is changed according to the change in the receive interface lead's normalized values. The raw data for the linking form's transmit interface lead is calculated according the receive interface lead's raw data value and the linking form's algorithm, see block 372. Then at block 374, the normalized data value for the linking form's transmit interface lead is determined according to the calculated raw data value. At decision block 376, the linking form processing is continued, if another linking form is linked; otherwise, the processing proceeds to all linked output forms.

As shown in FIG. 5, if, at decision blocks 366 and 376, a transmit interface lead is linked to a receive lead of output form, the normalized data value is calculated for an output form's receive interface lead that is linked to the transmit interface lead of the input or linking form, see block 380. This step is performed according to the determined normalized data value of the linked transmit interface lead. For example, if the transmit interface lead's normalized data value goes from 10 to 20, the receive interface lead's normalized data value will go from 10 to 20. Next at block 382, the raw data value is determined for the output form's receive interface lead according to the receive interface lead's normalized values and the output form's algorithm. Finally, the output device associated with the output form executes the function associated with the output form's receive interface lead, according to the determined raw data values, at block 384.

FIGS. 6–8 are screen shots of a multimedia program called Night Eyes created using the GUI 66 illustrated in FIG. 3, wherein Night Eyes execution is performed in accordance with FIGS. 4 and 5. In this example, a user has selected from the pull-down command menus 210 the following predefined forms: in/out 400; mouse 402; scale 404; note 406; and picture 408. The in/out form 400 is a linking form used for activating the other forms. Mouse form 402 is an input form with transmit interface leads that correspond to different mouse functions. The scale form 404 is another linking form for increasing or decreasing normalized data values or restricting the effective range of normalized data used. The note form 406 is an output form that corresponds to a MIDI sound processor. Picture form 408 is a graphical image output form that represents a particular previously defined image.

The interface leads of in/out form 400 and scale form 404 are not associated with any input or output device functions, because these forms are linking forms. When the control section of the "in" receive interface lead 440 is turned on, a normalized data value is generated from the "out" transmit interface lead 442 of the in/out form 400, because in/out form 400 is a linking form and the link between these interface leads is embedded. In in/out form 400, the "in" receive interface lead 440 is not associated with an output function of an output device. In/out form 400 determines the raw data of the "out" transmit interface lead 442, according to "in" receive interface lead 440 and an internal function, which in form 400 is a straight mapping between the two leads. The "in" receive interface lead 440 generates a normalized data value causing "out" transmit interface lead 442 to produce the same normalized data value for use by other linked receive interface leads. Similarly with scale form 404, the raw data value of "out" transmit interface lead 462 is determined according to scale forms 404 predefined algorithm and the set values of its receive interface leads.

The mouse form 402, note form 406 and picture form 408 are turned on, because arrows link their "on/off" receive interface leads to "out" transmit interface lead 442 of the in/out form 400. When the normalized data value of "out" transmit interface lead 442 goes to high, so will the normalized data values of the linked "on/off" receive interface leads. In all the linked "on/off" receive interface leads, a high normalized data value is translated into an "on" raw data value. When the mouse form 402 is turned on, mouse raw data signals are received and translated into normalized data values, according to the receive interface leads within the form. When the picture form 408 is turned on, the stored picture, i.e., black eyes, indicated within the control section of "picture" receive interface lead 448, is retrieved from its predefined memory location and displayed within the display window 206 in real-time. The function associated with the "picture" receive interface lead 448 is display picture. When the note form 406 is turned on, the functions indicated by the receive interface leads within the note form 406 ("midi output" receive interface lead 470 a indicates K2500 and "key" receive interface lead 472 indicates the key C) are performed. The note played is in the key C at the pitch level set in the "pitch"receive interface lead 460 through a MIDI output K2500.

As shown in FIGS. 6 and 7, a user with any level of programming skill may link the "down-up" transmit interface lead 456 of the mouse form to the "down-up" receive interface lead 457 of the picture form 408. The user may also link the "down-up" transmit interface lead 456 to the "in" receive interface lead 458 of the scale form 404 and to the "pitch" receive interface lead 460 within the note form 406. Further, the "out" transmit interface lead 462 of the scale form 404 has been linked to the "height scale" receive interface lead 464 of the picture form 408. Therefore, when the mouse is moved up, as shown in FIG. 7 by the right movement of the slide bar of the "down-up" transmit interface lead 456, the slide bar of "down-up" transmit interface lead 457 (to which the "down-up" transmit interface lead 456 is linked) moves to the right causing the eyes to move up in the display area 206. In addition, the slide bar of "pitch" receive interface lead 460 (to which the "down-up" transmit interface lead 456 is also linked) moves to the right causing the pitch of the MIDI output to increase. Finally, the slide bar of "height scale" receive interface lead 464 (to which the "down-up" transmit interface lead 456 is also linked) moves to the right, at a scaled value as determined by scale form 404, causing an increase in the black eyes' height.

The "in" receive interface lead 440 of the in/out form 400 has been placed in control area 212. This allows "in" receive interface lead 440 of form 400 to be operable or accessible at a higher hierarchical level. As shown in FIG. 8, the "in" receive interface lead 440 that was placed in control area 212 has been entered into a new form, Parent form 500, at a higher processing level. Thus, a user programming at the level illustrated in FIG. 8, experiences all the functionality of the forms from FIG. 7 and has space within the operating area 214 to create more form relationships for the program Night Eyes. The capitalization of the title of Parent form 500 indicates that this form encapsulates previously defined form interaction within one or more lower level operating areas 214. Double clicking the cursor on Parent form 500's title presents the encapsulated information, i.e., the forms 400–408 and the created links, shown by arrows displayed with the operating area 214 of FIG. 6. Essentially, Parent form 500 becomes a parent form and forms 400–408 become child forms.

The program Night Eyes is just an illustrative example of what the normalization of raw data allows a user of no programming skill to create. In this programming system virtually any input or output can be linked and manipulated in a simple and easy to use interface. Visualization and sonification are combined in any way the user sees fit. The multimedia programs created using the GUI 66 illustrated in FIG. 3 are a new form of incremental compilation. When a user creates or changes a link between two forms within an episode, the modification is immediate and the change can be tested without a delay for compilation. This reduces errors that result from making numerous changes before testing the modifications, and increases the rate of experimentation and evolution.

In summary, this invention is focused on a user friendly visual programming system that allows a user to combine, link and manipulate predefined forms representing data input devices or data output devices. The user can thereby encapsulate data and functions of many forms, and create hierarchical programs by using a visual programming system rather than by writing code. The number of encapsulation levels is only restricted by the amount of memory and processing power of the host computer. The present invention utilizes normalized data values to provide a universal mechanism for passing data values between input and output devices. As can be readily appreciated by those of ordinary skill in the art of interface, the features of the graphical user interface of the present invention could incorporated into any other type of interface, such as a voice actuated interface.

While the preferred embodiment of the invention has been illustrated and described, it will be appreciated that various changes can be made therein without departing from the spirit and scope of the invention.

What is claimed is:

1. A method for controlling output sources using input sources, said method comprising:
    (a) receiving a first raw data value based on an input function performed on an input source;
    (b) calculating a first normalized value for the received first raw data value;
    (c) changing a second normalized value based on the calculated first normalized value;
    (d) calculating a second raw data value for an output source based on the changed second normalized value; and
    (e) controlling the output source with an output function provided with the second raw data value, and wherein (a), (b), (c), (d) and (e) are performed in real-time.

2. A computer-readable medium with a computer program stored thereon for controlling data output sources using data input sources, said computer program comprising:
    a receiving component for receiving a first raw data vlaue based on an input function performed on an input source;
    a first calculating component for calculating a first normalized value for the receivced first raw data value;
    a changing component for changing a second normalized value based on the calculated first normalized value;
    a second calculating component for calculating a second raw data value for an output source based on the changed second normalized value; and
    a controlling component for controlling the output source with an output function provided with the second raw data value, wherein the receiving component, first calculating component, changing component, second calculating component and controlling component operate to control the output source in real-time.

3. A method performed on a computer for interoperating data inputs received from an input source and data outputs sent to an output source, said method comprising:
    defining input functions based on the data inputs;
    defining output functions based on the data outputs;
    linking at least one input function to at least one output function to indicate that the at least one output function will change as the linked at least one input function changes, and without determining if the type of data input upon which the at least one input function is based is compatible with the type of data output upon which the at least one output is based; and dynamically controlling the at least one output function by changing the at least one input function, wherein changing the linked at least one input function and controlling the at least one output function occur simultaneously.

4. The method of claim 3, wherein defining the input functions and the output functions comprises:

defining a normalized data range for data values assigned to the data inputs and the data outputs;

defining an input function raw data range for data values generated by an input function of a data input;

converting the data value generated by the input function into a data value within the normalized data range based on the input function raw data range;

defining an output function raw data range for data values received by an output function of a data output; and converting the data value assigned to the data output into a data value within the output function raw data range based on the normalized data range.

5. The method of claim 4, further comprising:

defining a relationship between the defined normalized data values of the data input and the data output; and setting the normalized data value of the data output based on the normalized data value of the data input and the defined relationship between the defined normalized data values of the data input and the data output.

6. The method of claim 5, wherein controlling the at least one output function comprises:

setting the normalized data value for the data input based on the normalized data value for the data output, the defined relationship between the defined normalized data values of the data input and the data output, and the linked data input; and determining the data value for the data output based on the set normalized data value for the data input.

7. The method of claim 6, further comprising storing the data output value.

8. The method of claim 5, wherein the data input comprises at least one of an aural data input or a visual data input.

9. The method of claim 8, wherein the data output comprises at least one of an aural data output or a visual data output.

10. The method of claim 5, wherein the data input is generated by an external device.

11. The method of claim 5, wherein the data input is generated internally.

12. The method of claim 5, wherein the data input comprises at least one signal data input.

13. The method of claim 3, wherein the data inputs are dynamic inputs, and whereby the data outputs are dynamic data outputs.

14. The method of claim 3, wherein said at least one input function is linked to a plurality of output functions.

15. A computer program stored on a computer-readable medium for programming the interoperability of input and output devices, said computer program comprising:

a first defining component for defining input functions of the input devices as transmit controls;

a second defining component for defining output functions of the output devices as receive controls; and a first linking component for linking at least one transmit control to at least one receive control without determining if the data processed by the input devices is compatible with the data processed by the output devices, such that the at least one output function defined by the at least one receive control is dynamically controlled in real-time by manipulating the input function defined by the at least one transmit control linked to the at least one receive control.

16. The computer program of claim 15, further comprising:

a normalized data range defining component for defining a normalized data range for data values assigned to the transmit and receive controls;

wherein the first defining component comprises:

an input function raw data range defining component for defining a input function raw data range for data values generated by an input function of an input device;

a first data value converting component for converting the data value generated by the input function into a data value within the normalized data range based on the input function raw data range and the normalized data range;

wherein the second defining component comprises:

an output function raw data range defining component for defining an output function raw data range for data values received by an output function of an output device;

a second data converting component for converting the data value assigned to the receive control into a data value defined in the output function raw data range based on the normalized data range and the output function raw data range.

17. The computer program of claim 16, wherein said first linking component comprises:

a first linking sub-component for linking said at least one transmit control to a transform receive control; and a second linking sub-component for linking a transform transmit control to said at least one receive control, wherein said transform transmit control has a defined relationship to said transform receive control, and wherein said at least one output function of the output device defined by the at least one receive control is dynamicaly controlled by manipulating the input function defined by said at least one transmit control linked to said at least one receive control and by said defined relationship between said transform transmit control and said transform receive control.

18. The computer program of claim 17, further comprising:

an input control form component that includes at least one transmit control associated with an input device; and an output control form component that includes at least one receive control associatied with an output device.

19. The computer program of claim 18, further comprising:

a linking control form component that includes at least one pair of a transform transmit control and an associated transform receive control.

20. The computer program of claim 19, further comprising:

an encapsulated control form component that includes one or more of at least one input control form, output control form and transform control form.

21. The computer program of claim 15, wherein said first linking component links said at least one transmit control to a plurality of receive controls.

22. A computer-based system for programming the interoperability of input and output devices, said computer-based system comprising:
   at least one input device with one or more input functions;
   at least one output device with one or more output functions;
   a display device;
   a processor with a computer program stored therein, said computer program comprising:
      a first defining component for defining the one or more input functions of the at least one input device as graphical transmit controls displayed on the display device;
      a second defining component for defining the one or more output functions of the at least one output device as graphical receive controls displayed on the display device;
      a first linking component for linking at least one graphical transmit control which defines at least one input function to at least one graphical receive control which defines at least one output function, wherein the at least one graphical transmit control is linked to the at least one graphical receive control without determining if the data processed by the at least one input device is compatible with the data processed by the at least one output device; and
      a first controlling component for dynamically controlling the one or more output functions defined by the at least one graphical receive control in real-time by manipulating the one or more linked input functions that are defined by the graphical transmit control linked to the at least one graphical receive control.

23. The system of claim 22, wherein said computer program further comprises:
   a normalized data range defining component for defining a normalized data range for data values assigned to the graphical transmit and receive controls;
   wherein the first defining component comprises:
      an input function raw data range defining component for defining a input function raw data range for data values generated by an input function of an input device;
      a first data value converting component for converting the data value generated by the input function into a data value within the normalized data range based on the input function raw data range and the normalized data range;
   wherein the second defining component comprises:
      an output function raw data range defining component for defining an output function raw data range for data values received by an output function of an output device;
      a second data converting component for converting the data value assigned to the graphical receive control into a data value defined in the output function raw data range based on the normalized data range and the output function raw data range.

24. The system of claim 23, wherein the transmit controls and the receive controls are graphical user slide bars.

25. The system of claim 23, wherein said first linking component within the computer program comprises:
   a first linking sub-component for linking said at least one graphical transmit control to a graphical transform receive control; and
   a second linking sub-component for linking a graphical transform transmit control to said at least one receive control, wherein said graphical transform transmit control has a defined relationship to said graphical transform receive control; and
   wherein said first controlling component within the computer program comprises:
      a first controlling sub-component for controlling said at least one output function of the output device defined by the at least one graphical receive control by manipulating the input device with the input function defined by said at least one graphical transmit control linked to said at least one receive control and by said defined relationship between said graphical transform transmit control and said graphical transform receive control.

26. The system of claim 25, wherein said computer program further comprises:
   an input control form component that includes at least one graphical transmit control associated with an input device; and
   an output control form component that includes at least one graphical receive control associated with an output device.

27. The system of claim 26, wherein said computer program further comprises:
   a linking control form component that includes at least one pair of a graphical transform transmit control and an associated graphical transform receive control.

28. The system of claim 27, wherein said computer program further comprises:
   an encapsulated control form component that includes one or more of at least one input control form, output control form and transform control form.

29. The computer-based system of claim 22, wherein said first linking component links said at least one graphical transmit control to a plurality of graphical receive controls.

30. A method for generating a multimedia computer program using a visual programming system, said method comprising:
   providing a plurality of input functions that produce data;
   providing a plurality of output functions that react to data;
   providing a mechanism for a user to define a relationship between any of the input functions and any of the output functions without determining if the type of data produced by the input function is compatible with the type of data to which the output functions reacts, wherein the mechanism causes the output function to react in real-time to the data produced by the input function with which the output function has a relationship; and
   generating a program in response to a user defining at least one relationship between at least one input function and at least one output function.

31. The method of claim 30, further comprising providing a plurality of linking functions, wherein a linking function manipulates data.

32. The method of claim 31, wherein at least one relationship between at least one input function and at least one output function includes at least one linking function between the at least one input function and the at least one output function.

33. the method of claim 32, wherein at least one relationship between any of the input functions and any of the output functions is a relationship between at least one input function and a plurality of output functions.

34. The method of claim 30, wherein providing a plurality of input functions that produce data comprises:

for each input function:
   determining a raw data range for the input function;
   creating a translation calculation for translating a raw data value in the raw data range into a normalized data value;
   creating a transmit interface lead for accessing the translation calculation; and
   providing a user access to the transmit interface lead.

35. The method of claim 34, further comprising, creating a form comprising at least one transmit interface lead, in response to a user request to create a form.

36. The method of claim 30, wherein providing a plurality of output functions that react to data comprises:
for each output function:
   determining a raw data range for the output function;
   creating a translation calculation for translating a raw data value in the raw data range into a normalized data value;
   creating a receive interface lead for accessing the translation calculation; and
   providing a user access to the receive interface lead.

37. The method of claim 36, further comprising creating a form comprising at least one receive interface lead, in response to a user request to create a form.

38. A system for providing a visual programming interface for creating real-time multimedia experiences comprising:
   a storage medium containing a graphical user interface component for receiving a plurality of user inputs, the user inputs identifying at least one data input device and at least one data output device; and
   a processor coupled to the storage medium for converting raw data received by the graphical user interface component from the at least one data input device into raw data to be output to the at least one data output device in real-time, wherein the processor converts the raw data received by the graphical user interface by:
     determining a received raw data range for the raw data received by the graphical user interface component;
     converting the raw data received by the graphical user interface component into normalized data within a normalized data range that is based upon the received raw data range;
     determining an output raw data range for the raw data to be output by the at least one data output device; and
     converting the normalized data into raw data within the output raw data range, wherein the raw data is to be output by the at least one data output device.

39. The system of claim 38, wherein each data input device comprises at least one input function.

40. The system of claim 39, wherein the input function comprises a plurality of input sub-functions.

41. The system of claim 39, wherein each input function is graphically represented in the graphical user interface component by a transmit interface lead.

42. The system of claim 41, wherein each data output device comprises at least one output function.

43. The system of claim 42, wherein the output function comprises a plurality of output sub-functions.

44. The system of claim 42, wherein each output function is graphically represented in the graphical user interface component by a receive interface lead.

45. The system of claim 44, wherein the graphical user interface component further comprises a mechanism for linking the transmit interface lead to the receive interface lead.

46. The system of claim 45, wherein the graphical user interface component further comprises a display component for displaying a graphical indication of a link created by the linking mechanism.

47. The system of claim 46, wherein the graphical user interface component further comprises an encapsulation component, wherein the transmit interface lead is encapsulated in an encapsulation layer in response to a user request to encapsulate the transmit interface lead.

48. The system of claim 47, wherein the graphical user interface component further comprises an encapsulation component, wherein the receive interface lead is encapsulated in an encapsulation layer in response to a user request to encapsulate the receive interface lead.

49. The system of claim 48, wherein the number of encapsulation layers is limited only by the storage medium and the processor speed.

50. The system of claim 39, wherein the at least one input function is predetermined.

51. The system of claim 50, wherein the at least one input function is capable of being altered by a user via the graphical user interface component.

52. The system of claim 39, wherein the at least one output function is predetermined.

53. The system of claim 52, wherein the at least one output function is capable of being altered by a user via the graphical user interface component.

54. A multimedia program embodied on a computer-readable medium, wherein the multimedia program is created by a method comprising:
   providing a plurality of input functions that produce data;
   providing a plurality of output functions that react to data;
   providing a mechanism for a user to define a relationship between any of the input functions and any of the output functions, without determining if the type of data produced by the input functions is compatible with the type of data to which the output functions react, wherein the mechanism allows the output function to be dynamically controlled by the input function in real-time; and
   generating the multimedia program in response to a user defining at least one relationship between at least one input function and at least one output function.

55. The multimedia program of claim 54, wherein the at least one output function generates visual data.

56. The multimedia program of claim 54, wherein the at least one output function generates audio data.

* * * * *

UNITED STATES PATENT AND TRADEMARK OFFICE
CERTIFICATE OF CORRECTION

PATENT NO.    : 6,331,864 B1
DATED         : December 18, 2001
INVENTOR(S)   : G.P. Coco et al.

It is certified that error appears in the above-identified patent and that said Letters Patent is hereby corrected as shown below:

Title page,
Item [57], ABSTRACT,
Line 12, after "endless number" insert -- of --

Column 3,
Line 20, "cd-rom, distal" should read -- CD-ROM, digital --
Line 21, "rideo disc (DVD)" should read -- video disc (DVD), --
Line 27, "robotics animatronics, machinery" should read
-- robotics, animatronics, machinery, --
Line 44, "generate or produce" should read -- generates or produces --

Column 4,
Line 19, "normalized data" should read -- normalized data. --

Column 5,
Line 1, "a form are" should read -- a form is --
Line 1, "a algorithm" should read -- an algorithm --
Line 8, "languages, that" should read -- languages that --
Line 58, "lead 224 and 225." should read -- leads 224 and 225. --

Column 6,
Line 11, "forms 218 Output" should read -- forms 218. Output --
Line 29, "leads are linked an arrow" should read -- leads are linked, an arrow --
Line 39, "a arrow 232" should read -- an arrow 232 --

Column 7,
Line 12, "appreciated to" should read -- appreciated by --
Line 13, "representation, that" should read -- representation that --
Line 36, "behaves as" should read -- behaves like --
Line 38, "FIGS. 8" should read -- FIG. 8 --
Line 61, "lead, see" should read -- lead; see --
Line 67, "algorithm, see" should read -- algorithm; see --

Column 8,
Line 10, "form, see" should read -- form; see --
Line 63, "to high," should read -- too high, --

Column 9,
Line 11, "a indicates" should read -- indicates --
Line 26, "FIG. 7 by" should read -- FIG. 7, by --
Line 47, "FIG. 8, experiences" should read -- FIG. 8 experiences --

UNITED STATES PATENT AND TRADEMARK OFFICE
CERTIFICATE OF CORRECTION

PATENT NO. : 6,331,864 B1
DATED : December 18, 2001
INVENTOR(S) : G.P. Coco et al.

It is certified that error appears in the above-identified patent and that said Letters Patent is hereby corrected as shown below:

Column 10,
Line 19, "could incorporated" should read -- could be incorporated --
Line 44, "data vlaue" should read -- data value --
Line 48, "receivced" should read -- received --

Column 12,
Line 17, "a input" should read -- an input --
Line 54, "associatied" should read -- associated --

Column 13,
Line 14, "a input" should read -- an input --
Line 45, "produced by the input function" should read -- produced by the input functions --

Column 14,
Line 46, "output functions reacts," should read -- output function reacts, --
Line 62, "claim 32," should read -- claim 31, --

Signed and Sealed this

Eighteenth Day of June, 2002

Attest:

JAMES E. ROGAN
Attesting Officer
Director of the United States Patent and Trademark Office